United States Patent [19]

Motta

[11] Patent Number: 5,646,683
[45] Date of Patent: Jul. 8, 1997

[54] IMAGING SYSTEMS

[75] Inventor: Ricardo J. Motta, Mountain View, Calif.

[73] Assignee: Hewlett-Packard Company, Palo Alto, Calif.

[21] Appl. No.: 534,779

[22] Filed: Sep. 27, 1995

Related U.S. Application Data

[62] Division of Ser. No. 236,781, Apr. 29, 1994, Pat. No. 5,481,300.

[51] Int. Cl.$^6$ ................................ H04N 1/04; H04N 3/08
[52] U.S. Cl. ............................ 348/203; 348/205; 348/335; 348/744; 348/759; 348/764; 250/208.1
[58] Field of Search ........................ 348/203, 205, 348/295, 335, 260, 264, 266, 744, 759, 757, 764, 771; 210/208.1; H04N 1/04, 3/08

[56] References Cited

U.S. PATENT DOCUMENTS

| | | | |
|---|---|---|---|
| 4,129,887 | 12/1978 | Michon | 358/213 |
| 4,330,793 | 5/1982 | Stemme et al. | 358/56 |
| 4,442,457 | 4/1984 | Pines | 358/213 |
| 4,516,159 | 5/1985 | Diepereen | 358/293 |
| 4,575,632 | 3/1986 | Lange | 250/334 |
| 5,075,539 | 12/1991 | Shiraishi | 250/208.1 |
| 5,212,555 | 5/1993 | Stolz | 358/206 |

FOREIGN PATENT DOCUMENTS

| | | | |
|---|---|---|---|
| 392256 | 10/1990 | European Pat. Off. | H04N 12/08 |
| 452188 | 10/1991 | European Pat. Off. | H04N 3/08 |
| 0576704 | 1/1995 | European Pat. Off. | G06K 9/20 |
| 06398 | 4/1992 | WIPO | H04N 13/08 |

*Primary Examiner*—Glenton B. Burgess

[57] ABSTRACT

Currently, electronic imaging cameras use expensive array photodetectors instead of inexpensive linear photodetectors because they cannot scan linear detectors across the entire image within their exposure time and because the linear photodetectors do not capture sufficient photons to produce a high quality image. An image capture system is described that has a lens to form an image on an imaging plane, a linear detector mounted to preclude translational motion, a mirror for deflecting the image to the plane of the linear detector, and a mechanism that moves the mirror to scan the image across the linear detector.

10 Claims, 12 Drawing Sheets

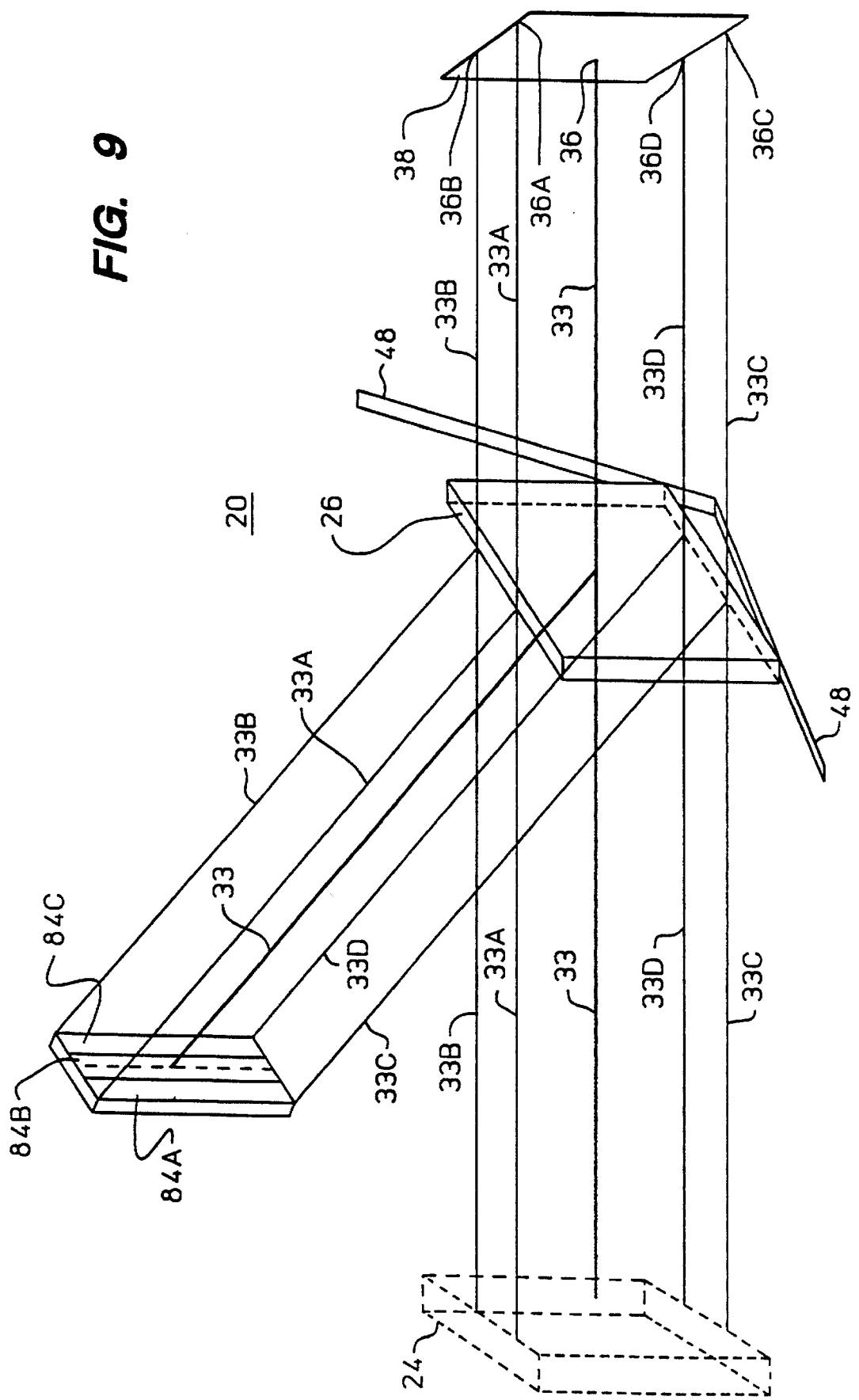

5,646,683

IMAGING SYSTEMS

CROSS REFERENCE TO RELATED APPLICATION

This is a divisional of application Ser. No. 08/236,781 filed on Apr. 29, 1994, now U.S. Pat. No. 5,481,300.

FIELD OF THE INVENTION

The invention relates generally to the field of imaging systems.

BACKGROUND AND SUMMARY OF THE INVENTION

Currently, electronic imaging cameras use two-dimensional arrays of light sensitive elements, sometimes of the type known as CCD (i.e., charged coupled devices) photodetectors, that convert light into electronic charges. There are many relatively low-priced color and black & white array CCD detectors available for video imaging, but they produce low quality images as measured by their low pixel (i.e., picture element) count and dynamic range. Array CCD photodetectors that produce images having a quality comparable to conventional 35 mm chemical photography must have a resolution of approximately 3000 by 2000 pixels . These arrays are expensive because they have low manufacturing yields.

Linear photodetectors cost much less than array detectors because they are much smaller and have higher manufacturing yields. The problem with linear photodetectors is that they* resolve only one line of pixels at a time and must scan the entire image, line by line, within the exposure time of the camera. The exposure time of hand held cameras must be less than 1/15 of a second because users cannot hold cameras still for longer than this. Ideally, the exposure time is much shorter, such as 1/125 of a second.

Previously known hand held cameras cannot use linear photodetectors because they cannot scan the linear detector across the entire image within their exposure time and because the linear photodetectors do not capture sufficient photons to produce a high quality image. If a previously known hand held camera were able to scan the linear detector across the entire image within its exposure time, the linear photodetector would be traveling at such high velocities and accelerations that it would jerk the camera out of the hands of the user.

Previously known stationary imaging systems, such as copiers and photographic scanners can improve their image quality by increasing the amount of ambient light and/or the exposure time. These techniques do not work for hand held cameras because of their short exposure time and their need to operate in a variety of light conditions.

For the reasons previously discussed, it would be advantageous to have an image capture system that scans an image across a detector very quickly without requiring the detector to move at prohibitively large velocities or accelerations. Also, it would be advantageous to have an image capture system that can increase the number of photons captured during a scan.

This invention is a system for capturing an image that has a lens to form an image on an image plane, a detector mounted to preclude translational motion, a mirror for deflecting the image to the plane of the detector, and a mechanism that moves the mirror to scan the image across the detector. The plane of the mirror "bisects" (i.e., divides into two equal parts) at 90°, an imaginary line between a cell on the detector that captured a portion of the image called here a "bundle of light" and a corresponding focal point on the image plane (i.e., the bundle of light that focuses on the cell of the detector has another focal point on the image plane called the corresponding focal point). If the detector has a width greater than one cell, then the detector rotates synchronously with the mirror. The image capture system can capture "images" produced by electromagnetic waves of any frequency and it is adaptable to many different devices, for example: photocopiers, hand-held still cameras, motion picture cameras, film scanners, scanners connected to printers to form copiers, fax machines, scanners connected to memory for storing images, scanners connected to computers for altering images, microscopes, telescopes, coherent optics systems, and many other systems.

This image capture system has the advantage that the motion of the detector and the motion of the mirror are minimized; and it can use inexpensive linear photodetectors, such as linear CCD photodetectors, to capture high-quality images.

The image projection system is similar to the image capture system except that it operates in reverse and has an array of light generation elements instead of a light detector. The image projection system has light generation elements mounted to preclude translational motion, a mirror for deflecting the image, and a mechanism that moves the mirror to scan the image. Again, a mirror plane bisects at 90°, an imaginary line between a cell on the light generation element that generates a portion of the image called the "bundle of light" and a corresponding focal point on the image plane (i.e., the bundle of light that originates from the photoemitter has another focal point on the image called the corresponding focal point).

BRIEF DESCRIPTION OF THE DRAWINGS

FIG. 9 is a three dimensional drawing that shows the operation of the image projection system.

DETAILED DESCRIPTION OF THE INVENTION

Figure 1A:
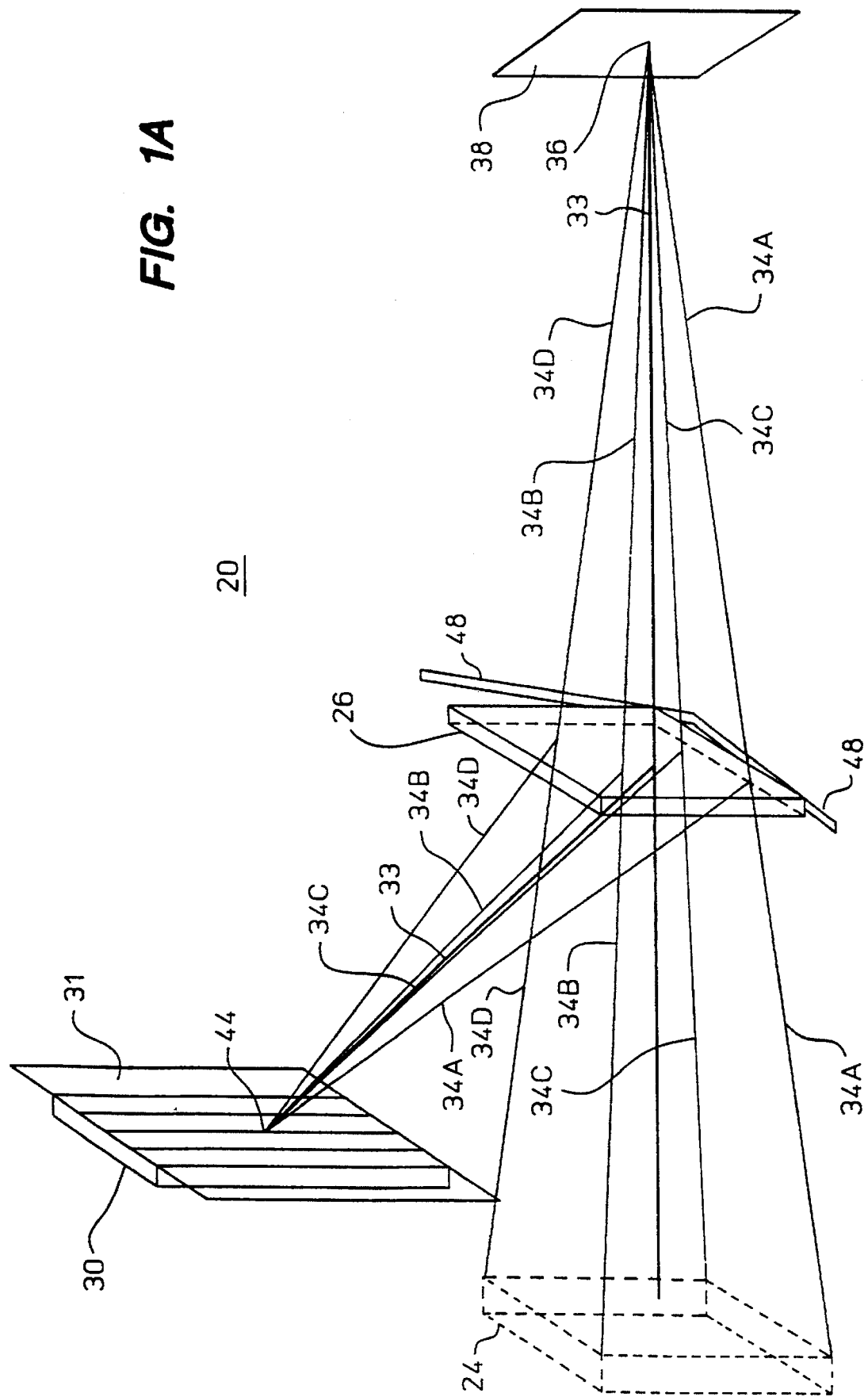
FIGS. 1A and 1B are three dimensional drawings that show the operation of the preferred embodiment of the image capture system.

FIG. 1A is a three dimensional diagram that shows the operation of the image capture system 20. Each bundle of light has a principal ray 33 (i.e., a light beam in the center of the bundle) and many auxiliary rays represented by auxiliary rays 34A–34D that come into focus at a position known as the corresponding focal point 36 on image plane 38. In image capture system 20, the bundle of light that focuses on a corresponding focal point 36 on image plane 38 passes through an "image forming system" 24 (i.e., any of many systems for focusing an image on image plane 38, such as, a telescope, a periscope, a microscope, a single lens, holographic lens, a coherent optic system, telephoto lens, a mirror, an image stabilizer, a filter, as well as many other devices.) Then, a mirror 26 deflects it from its path enroute to image plane 38 to a detector plane 31 and a detector 30 where it focuses on a cell 44. Tracks 48 represent one of many possible devices that control the trajectory of mirror 26.

Figure 1B:
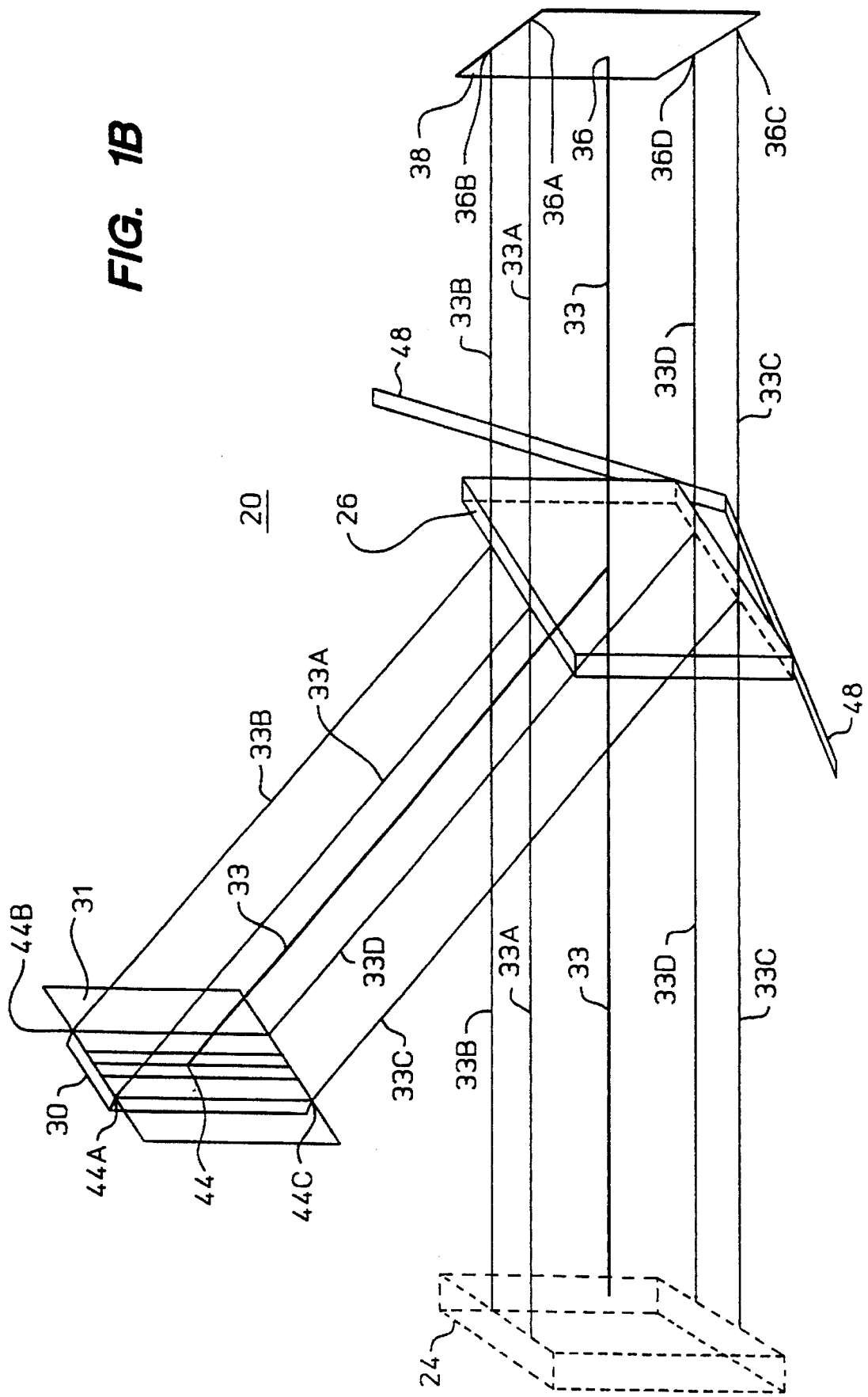

FIG. 1B represents additional bundles of light solely by their principal rays 33, 33A, 33B, 33C, and 33D to simplify the drawings. Each bundle of light is detected by a different photocell 44, 44A, 44B, 44C, 44D and has a different corresponding focal point 36, 36A, 36B, 36C, 36D. A best mode of the invention uses linear TDI (i.e., time delay integration) photodetectors that have chains of horizontally integrated photocell stages that transfer charge between one another to increase the exposure time of the image capture system. As mirror 26 scans the bundles of light represented by principal rays 33, 33A, 33B, 33C, and 33D across photodetector 30, electrical charges move synchronously from one photocell to another horizontally integrated photocell.

Figure 5:
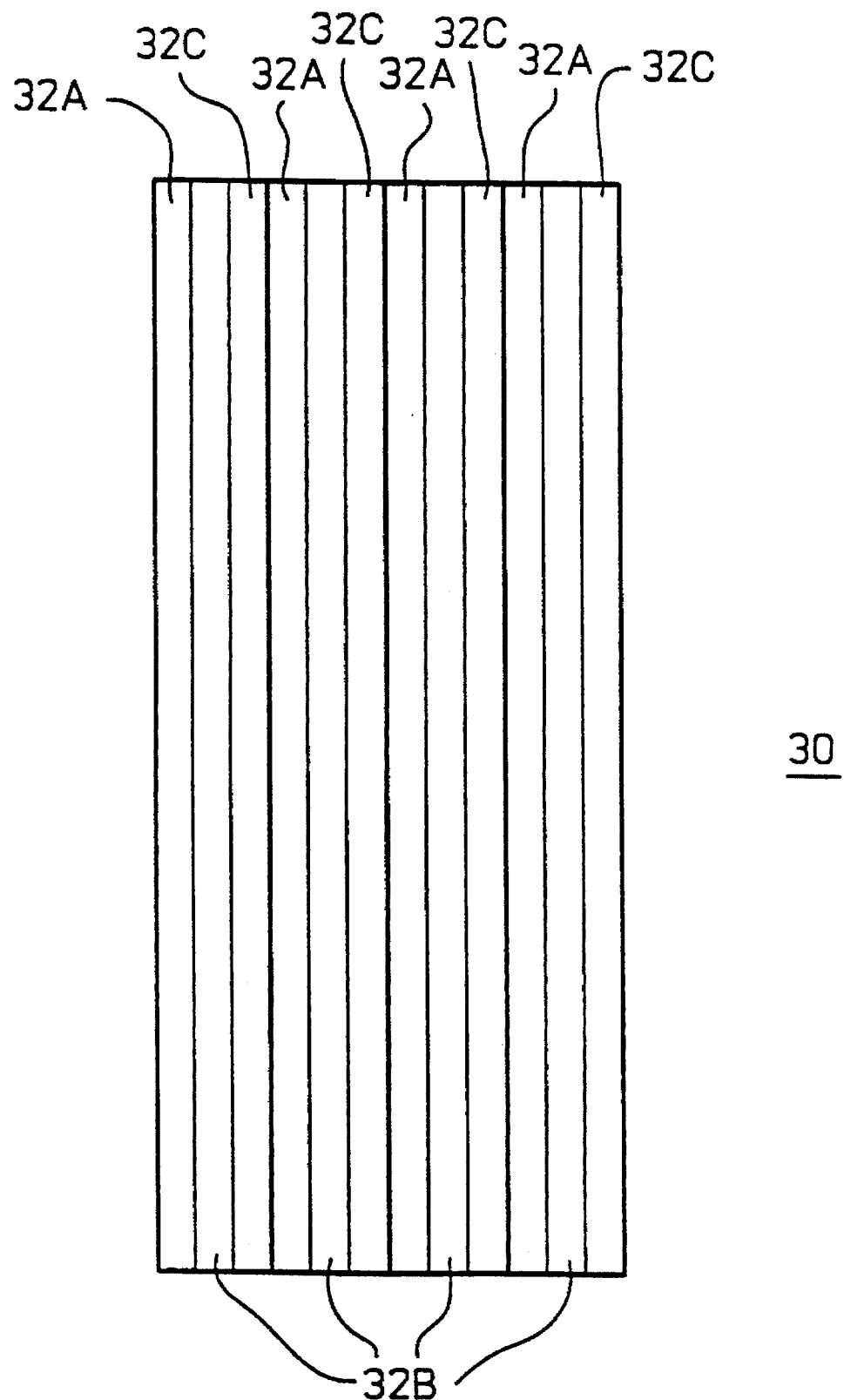
FIG. 5 shows the preferred embodiment of the photodetectors.

FIG. 5 shows an embodiment of photodetector 30. It has four groups of three TDI CCD detectors 32A, 32B, and 32C, each covered by a different filter so that each detects either a red, green, or blue light. (Photodetectors can have filters of different colors without departing from the scope of the invention). The TDI detectors 32A, 32B, and 32C are mounted side-by-side and each TDI detector has approximately 100 stages that results in mirror 26 scanning the image over approximately 1200 stages while that photodetector 30 rotates at an angular speed that is twice that of mirror 26. Alternative embodiments of the invention may use any number of photodetectors or groups of three photodetectors without departing from the scope of the invention. Additionally, the photodetectors may be point detectors, linear detectors, or have any width without departing from the scope of the invention. Alternative embodiments of the invention may use any type of light sensitive material, even photofilm if it moves with mirror 26.

Image capture system 20 limits the velocities and accelerations generated by the system by precluding translational motion of the detector and by making mirror 26 or a mirror plane 28 (i.e., mirror means refers to mirror 26 and/or mirror plane 28) bisect at 90° an imaginary line between cell 44 on detector 30 and its corresponding focal point 36 and by making photodetector 30 rotate synchronously with and at twice the rotational rate of mirror 26 when the width of detector 30 is greater than one cell. FIGS. 2A–2C and 3 describe this unique trajectory and rotation in more detail.

Figure 2A:
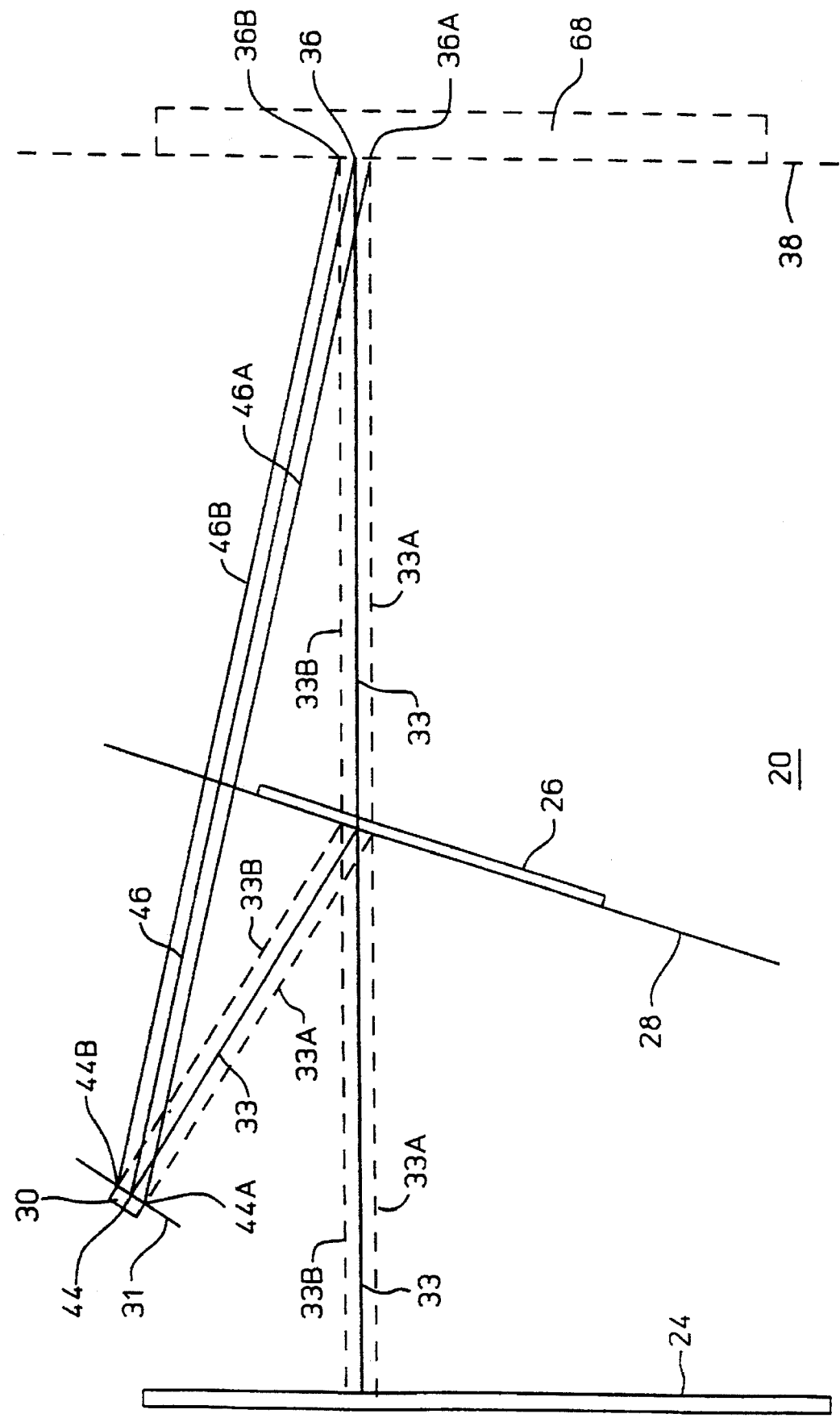
FIGS. 2A, 2B, and 2C are top views of the image capture system shown in FIGS. 1A and 1B with the mirror at three different positions in its trajectory.

FIG. 2A is a top view of the best mode of image capture system 20 that illustrates the invention. To simplify the drawings, FIGS. 2A–2C, 3, and 4 use only the principal ray to represent a bundle of light. The bundles of light that would otherwise focus on corresponding focal points 36, 36A, and 36B of image plane 38, pass through image forming system 24, deflect off mirror 26, and travel to photocells 44, 44A, and 44B at the center and at opposite ends of photodetector 30, respectively. In this invention, the trajectory of mirror 26 results in mirror plane 28 bisecting at 90°, lines 46, 46A, and 46B that extend from photocells 44, 44A, and 44B to their corresponding focal points 36, 36A, and 36B. A result of this geometry is that the distance between mirror 26 and photocells 44, 44A, and 44B always equals the distance between mirror 26 and their corresponding focal points 36, 36A, and 36B. The advantage of this unique trajectory is that it minimizes the motion of mirror 26 and photodetector 30 so that mirror 26 can scan the image onto photodetectors 30 (that do not have translation motion) within the exposure time of the camera without generating unwieldy forces. The exposure time of the image capture system 20 will be at least partially determined by the device that uses it.

Mirror plane 28 not only bisects lines 46, 46A, and 46B but it bisects all imaginary lines between all photocells and their corresponding focal points. The best mode of the invention uses four groups of three 100×2048 TDI photodetectors, as shown in FIG. 5. Each group has 614,400 photocells, 614,400 corresponding focal points, and 614,400 lines between the photocells and the corresponding focal points that mirror plane 28 bisects at 90°.

Figure 2B:
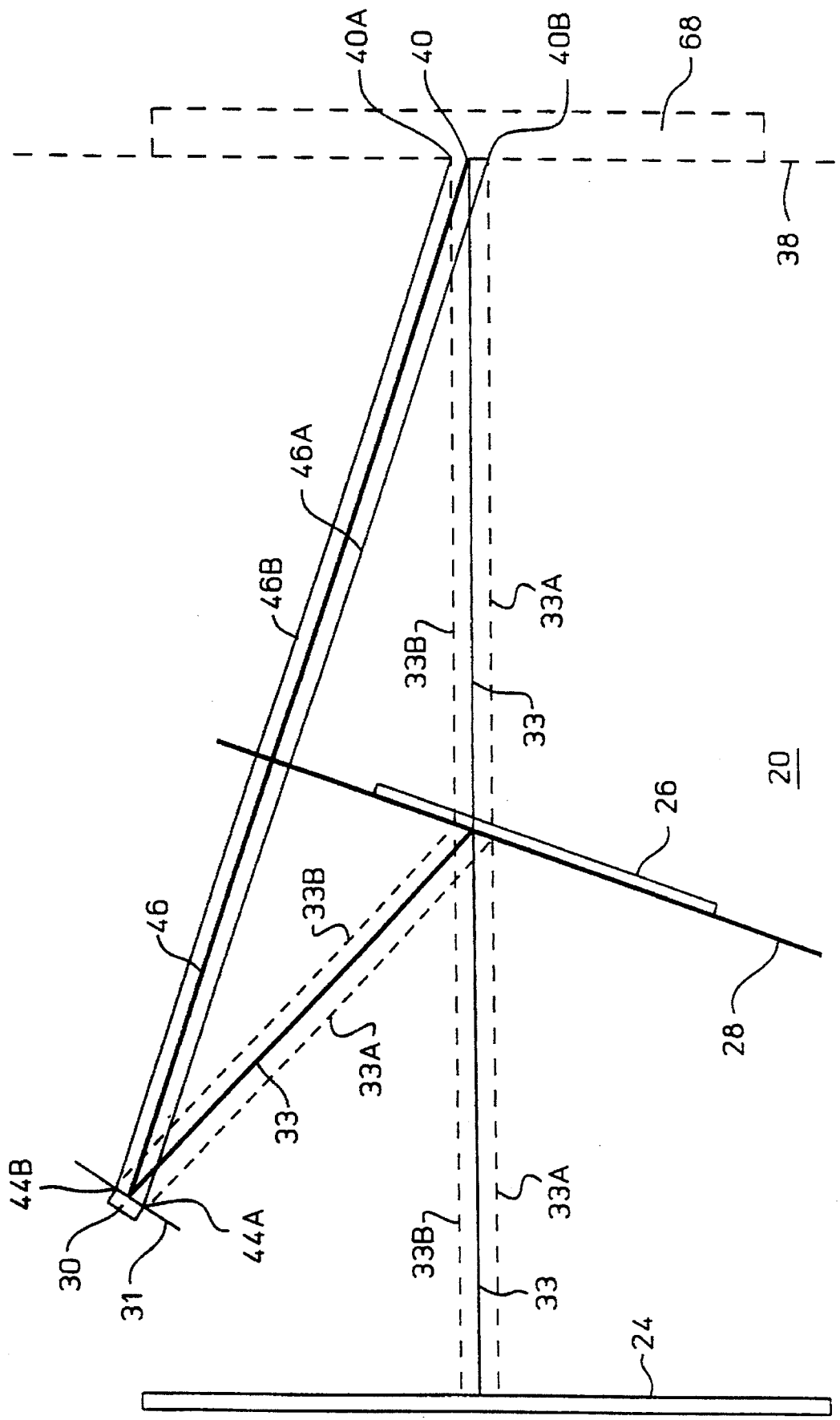
Figure 2C:
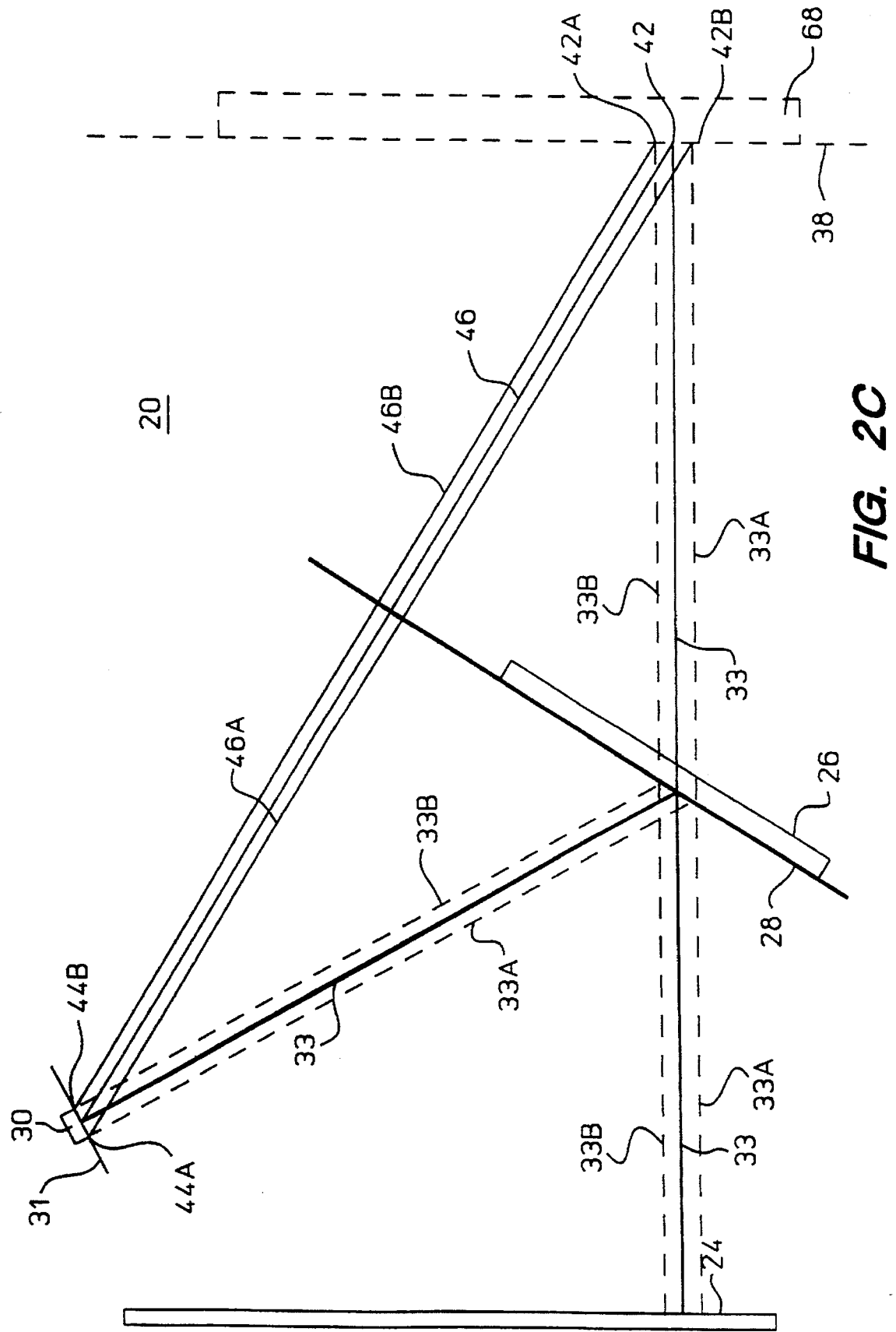

FIGS. 2B and 2C show that despite the position of mirror 26 in its trajectory, mirror plane 28 always bisects, at 90°, imaginary line 46 connecting photocell 44 and its corresponding focal point 40 or 42 on image plane 38. In FIG. 2B, the position of mirror 26 causes it to deflect a bundle of light represented by principal ray 33 to photocell 44. This bundle of light would otherwise focus on a corresponding focal point 40 on image plane 38. In FIG. 2C, mirror 26 reflects a bundle of light represented by principal ray 33 to photocell 44 that would otherwise focus on location 42 of image plane 38. Although the position of the corresponding focal point changes, the position of mirror 26 changes, and the distance from mirror 26 to photocell 44 changes, mirror plane 28 always bisects, at 90°, imaginary line 46 between photocell 44 and corresponding focal point 36, 40, or 42 on image plane 38.

In the preferred embodiment, mirror 26 reflects all light that strikes it and image plane 38 is not an actual device, but instead, an imaginary plane of focal points. In alternative embodiments of the invention, mirror 26 moves out of the way or transmits some of the light that strikes it (e.g., 25%). This light travels to the position of image plane 38 where it focuses on a secondary device 68 (shown in outline form on FIGS. 2A, 2B, and 2C), such as an autofocus sensor, contrast ratio sensor, automatic exposure sensor, viewfinder, or other device that would inspect the incoming image and adjust the camera. Thus, some alternative embodiments of the invention have two or more light sensitive devices at two or more focal planes.

Figure 3:
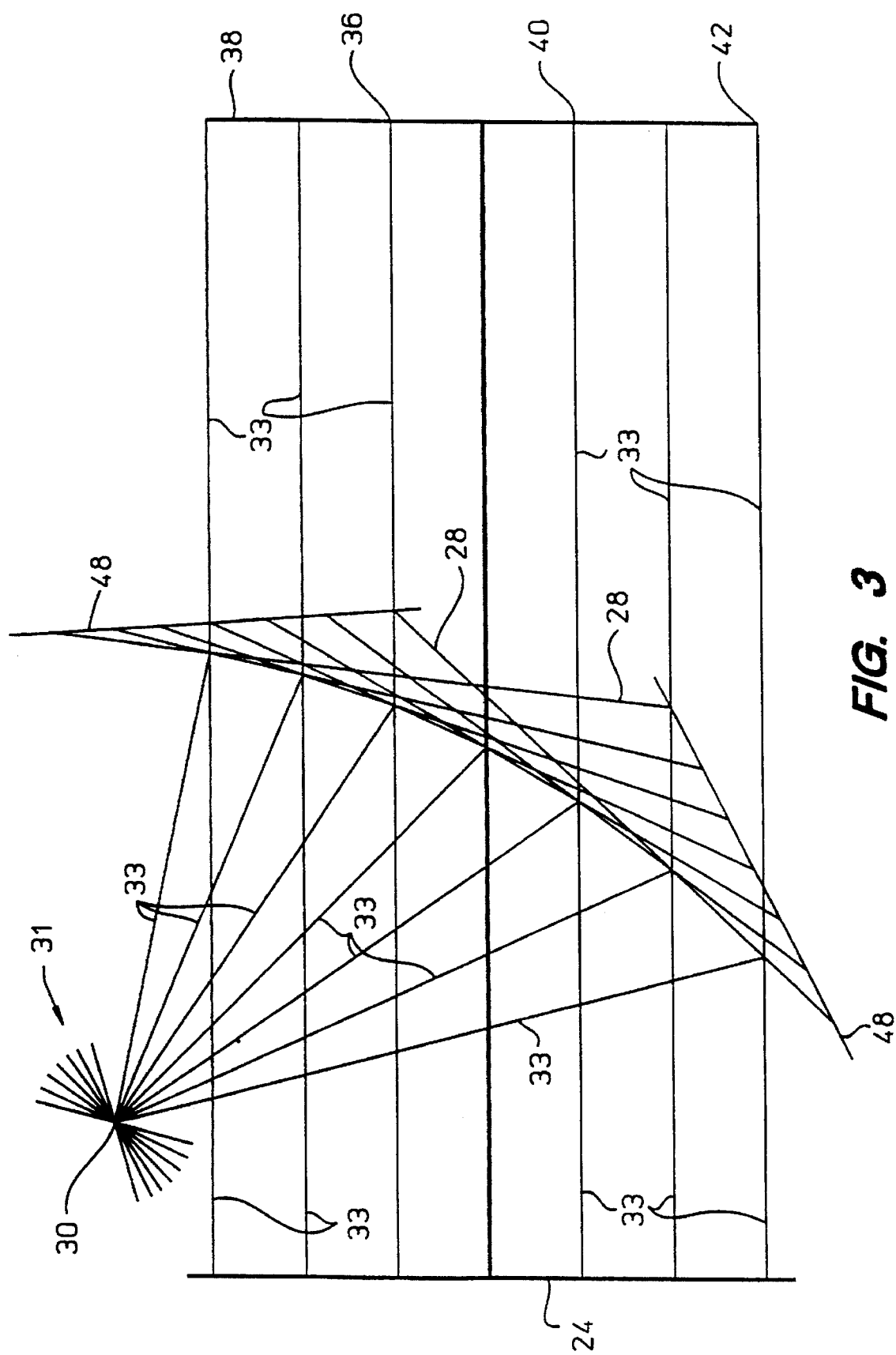
FIG. 3 is a top view of the trajectory of the mirror shown in FIGS. 1 A, 1 B, and 2A–2C as the mirror scans an image onto the linear detectors.

FIG. 3 shows various positions of mirror plane 28, as it scans the image onto photodetector 30. In every position, the distance between mirror plane 28 and photocell 44 equals the distance between mirror plane 28 and corresponding focal point 36, 40, or 42 on image plane 38 though that distance changes as mirror 26 moves. Mirror plane 28 always bisects imaginary line 46 (not shown for clarity) at 90°. FIGS. 2A, 2B, and 2C and FIG. 3 show the synchronization between the movement of mirror 26 and the rotation of photodetector 30 such that photodetector 30 rotates twice as much as mirror 26 when photodetector 30 has a width greater than one photocell. In an alternative embodiment of the invention, photodetector 30 has a width of one photocell, such as a point detector or a linear detector, and it does not rotate.

Figure 4:
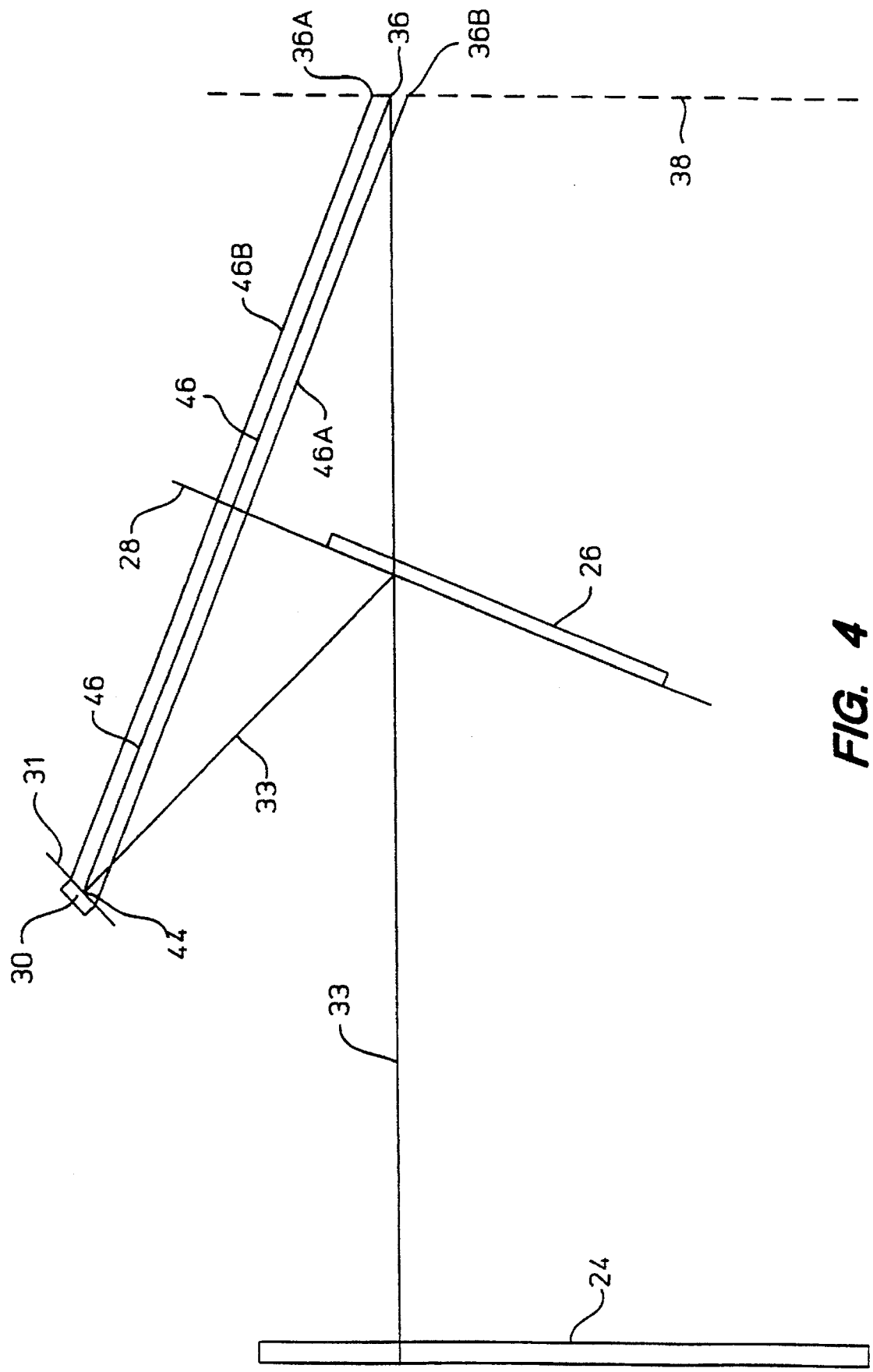
FIG. 4 shows an alternative location of the photodetectors that provides space for the construction of baffles or other device.

FIG. 4 shows image capture system 20 with photodetector 30 in alternative positions. Mirror plane 28 still bisects line 46 at 90°. One advantage of this invention is that photodetectors 30 can reside in a variety of positions. One advantage of this flexibility is that photodetectors 30 can be positioned to minimize the effect of stray light by constructing baffles near photodetector 30.

An example of a TDI CCD linear photodetector 32A, 32B, 32C, shown in FIG. 5 is the IT-E1 Series TDI Quiet-sensor™ available from Dalsa Inc., Waterloo, Ontario, Canada (Phone: 519-886-6000). Mirror 26 with its unique trajectory may be used with any type of photodetector. For example, a single 1×2048 photodetector may be used for capturing black and white images. Other photodetectors and photosensitive films can be used without departing from the scope of the invention. Additionally, other configurations of photosensitive devices, such as the mosaic photodetector shown in FIG. 6, can be used without departing from the scope of the invention.

Each TDI photodetector 32A, 32B, 32C used in the best mode of this invention is an array of photocells having a height of 2048 rows of photocells and a width of 96 photocells connected so electrical charges created in one photocell transfers to a neighboring photocell at a specified time interval. Alternative embodiments of the invention may use other types of photodetectors with sizes other than 96×2048 without departing from the scope of the invention. A detector controller 66 and a camera controller 58 shown in FIG. 7 synchronize the transfer of charges between photocells with the motion of mirror 26 and thereby with the motion of the image across TDI detector 30. A second photocell located adjacent to a first photocell converts photons from the same bundle of light into an electric charge and adds this to the electric charge transferred from the first photocell. The image capture system 20 repeats this 95 times across detector 30. The advantage of using TDI CCD linear detectors 32A, 32B, 32C is that they effectively give the image a longer exposure. This results in a higher effective sensitivity to light and a greater spatial uniformity and fidelity in the captured image. Additionally, it allows image capture system 20 to produce a high resolution/high quality image with less light.

As stated earlier, an array photodetector must have the dimensions of approximately 3000×2000 pixels to produce an image having a quality comparable to conventional 35mm chemical photography. When the linear photodetector or TDI photodetector has a length of 1×2048 photocells, it must resolve the other dimension of the image into 3072 pixels. This is accomplished by scanning the image across photodetector 30.

In a hand-held camera this must be done in $\frac{1}{15}$ second or less. This results in an exposure time of approximately (($\frac{1}{15}$)/3000) or 1/(45,000) of a second for each pixel. A 96×2048 TDI linear detector increases the length of the exposure by 96. Increasing the number of horizontally integrated photocells further lengthens the exposure. A 96×2048 TDI linear photodetector is much more effective than ninety-six 1×2048 linear photodetectors mounted side by side because the charge transfer mechanism within a chip has a much better signal-to-noise ratio then transferring an electric signal between chips.

Figure 6:
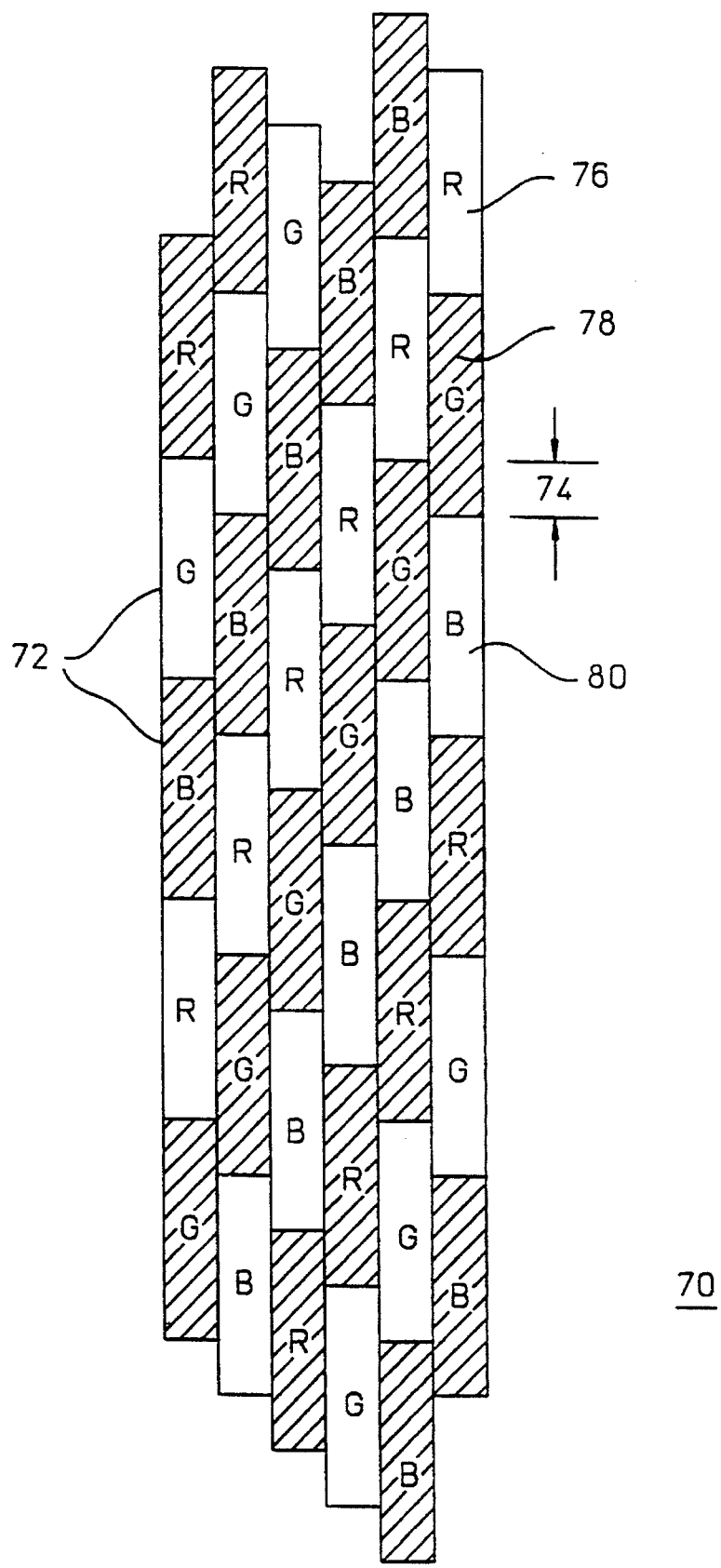
FIG. 6 shows an alternate embodiment of the photodetectors.

An alternative embodiment of the invention uses a mosaic photodetector 70 shown in FIG. 6. Mosaics of photodetectors 70 may have the advantage of being inexpensive because they use many small photodetectors 72 that have high yields. Small photodetectors 72 can be time delay and integration (TDI) photodetectors having any dimensions, such as 256 rows of photocells, each row containing 96 photocells chained together. Photodetectors 72 are assembled onto multi-chip modules. In FIG. 6, mosaic photodetector 70 has the photodetectors arranged into columns with a red photodetector 76, then a green photodetector 78, then a blue photodetector 80, and the pattern repeats itself. The various columns are staggered and the color at the top of the column changes so there is some overlap 74 between similar colors in different columns. After the image is scanned on to this photodetector, image processing techniques are used to reassemble the image. In this example, a complete scan segment has four columns of photodetectors.

In alternative embodiments of the image capture system that have a long exposure time, image forming systems 24 may use an image stabilizer. Image stabilizers compensate for small deviations in the position of the camera so that the image projected onto mirror 26 remains stationary. The image stabilizer can be liquid baffles controlled by accelerometers, liquid deforming lens, gyro-controlled lens as well as other devices. When the image stabilizer cannot compensate for motion because either the frequency or the amplitude of the motion is too great, signal processing techniques can be used on the digitized image to correct distortions introduced by this motion.

Figure 7:
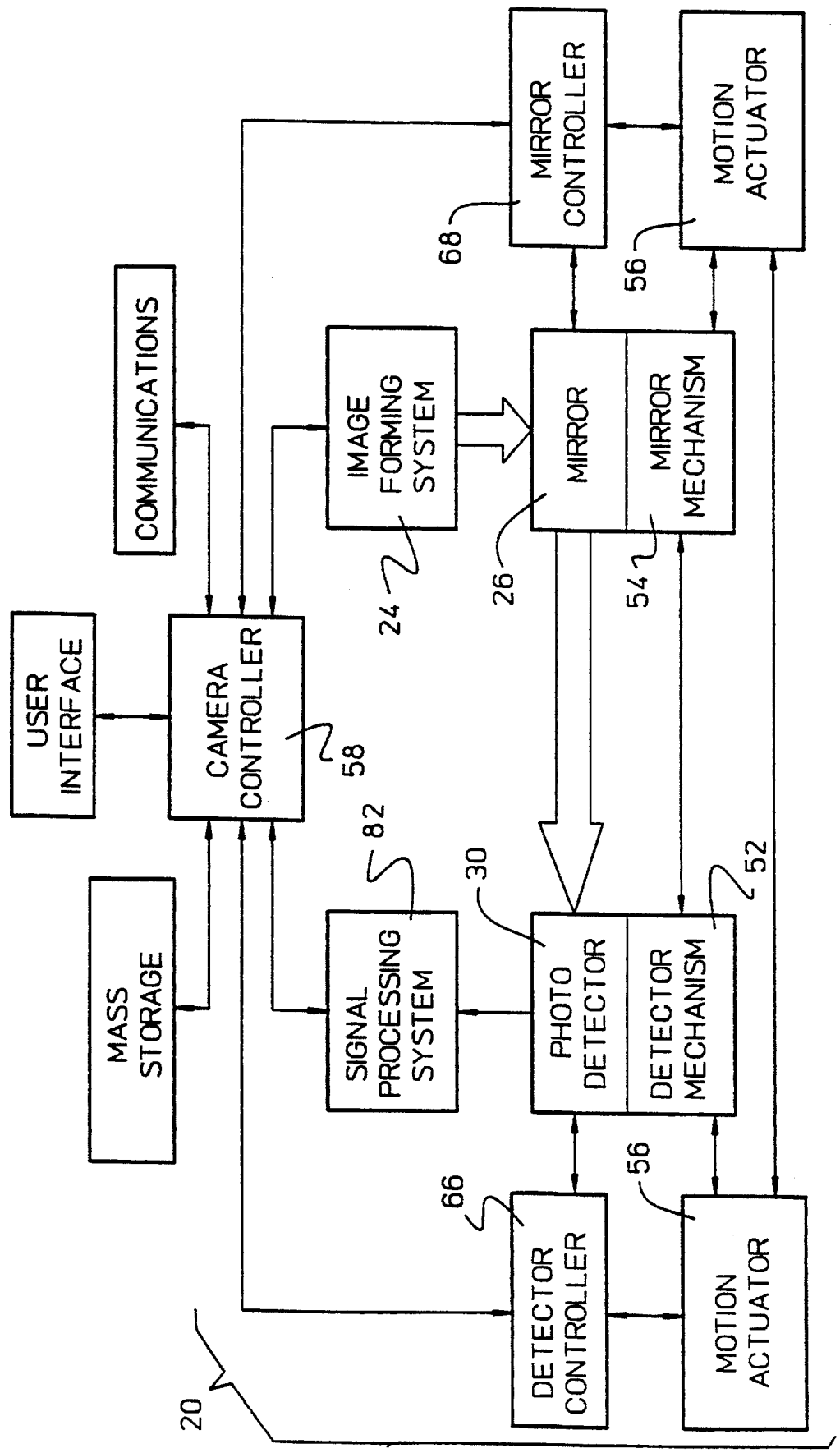
FIG. 7 is a block diagram of an image acquisition system using the image capture system shown in FIGS. 1–4.

FIG. 7 shows a block diagram of a camera system that uses image capture system 20. A light image travels through image forming system 24 to mirror 26 that reflects it to photodetector 30. A mirror controller 68 receives commands from a camera controller 58, senses the position of mirror 26 and commands a motion actuator 56 to transmit power to a mirror mechanism 54. Mirror mechanism 54 uses this power to move mirror 26 along a trajectory that causes it to scan an image across detector 30 and that causes mirror plane 28 to bisect at 90° imaginary lines 46 that extend between cells 44 of detector 30 and their corresponding focal points 46.

When detector 30 has a width greater than one cell 44, a detector controller 66 receives commands from camera controller 58, detects the position of photodetector 30, and commands motion actuator 56 to provide power to a detector mechanism 52 that causes detector 30 to rotate at twice the rotation speed of mirror 26. The output of photodetector 30 goes to a signal processing system 58 that combines the output of the photodetectors 30 to form a color image. Camera controller 58 coordinates the operation of the signal processing system 82 with the movement of mirror 26 and photodetectors 30.

Detector 30 and mirror 26 can use the same motion actuator 56 or different motion actuators 56. Motion actuator 56 can be a motor, or a spring loaded mechanism, or other devices without departing from the scope of the invention. Detector mechanism 52 can be gears, pulleys, or other devices that cause the detector to rotate at the desired speed. Mirror mechanism 54 can be a mirror support attached to motor actuator 56 through gears, pulleys, or other devices to give it desired translational motion. Rotational motion can be achieved by tilting the mirror support when it has translational motion. This combination of translational and rotational motion can be achieved by a wide variety devices that one with ordinary skill in the art could design.

Image capture system 20 can be installed in wide variety devices: photocopiers, hand-held still cameras, motion picture cameras, film scanners, scanners connected to printers to form a copier, fax machines, scanners connected to memory for storing the image, scanners connected to computers for altering the image, microscopes, telescopes, coherent optics systems, and many other image capture systems. The host device will determine what type of mass storage, user interface, and communications links will attach to image capture system 20.

Figure 8:
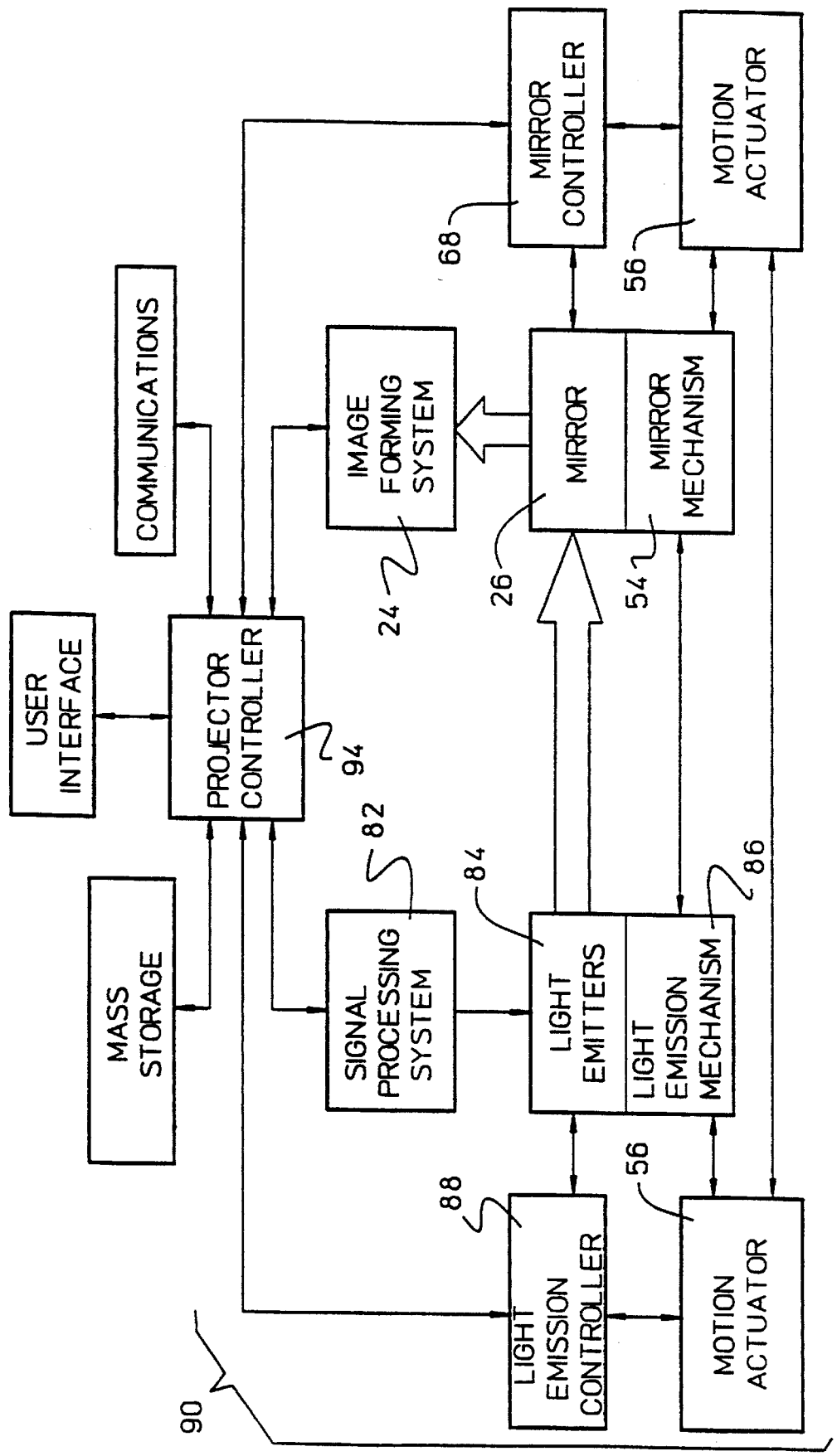
FIG. 8 is a block diagram of an image projection system.

FIG. 8 is a block diagram of an image projection system 90 that is very similar to image capture system 20 shown in FIGS. 1A–FIG. 7 with the exceptions being that it has light emitters 84 instead of detectors 30 and that it operates in reverse of image capture system 20. Mass storage 92 stores information that creates an image. This information is transmitted to signal processing system 82 by projector controller 94. Signal processing system 82 prepares this information for light emitters 84A, 84B, and 84C, each light emitter has a different color filter to produce as many as three different bundles of light for each portion of the image. If black and white images are produced than only one light emitter will be used. Projector controller 94 scans the image across light emitters 84A, 84B, and 84C. Mirror 26 intercepts these bundles of light and scans them across image forming system 24. The trajectory of mirror 26 for image projection system 90 is the same as the trajectory of mirror 26 for the image capture system shown in FIG. 1A, 1B, 2, 3, and 4. Image formation system 24 focuses the bundles of light to form an image at a distant point.

FIG. 9 shows the path of a bundle of light in image projection system 90. A cell 86 of light emitter 84 emits a bundle of light containing a principal ray 33, and auxiliary rays 34A, 34B, 34C, and 34D. Mirror 26 deflects this bundle of light to image formation system 24 that focuses it on an distant plane.

What is claimed is:

1. A system for projecting an image, comprising
   a. a light emitter means, for producing bundles of light corresponding to portions of the image to be projected;
   b. an image formation system for focusing the bundles of light to form the image at a distant point;
   c. a mirror located to deflect the image to the plane of the image formation system;
   d. a mirror mechanism, attached to the mirror, the mirror mechanism moves the mirror;
   e. a light emission mechanism, attached to the light emitter means, the light emission mechanism rotates the light emitter means synchronously with the movement of the mirror; and
   f. a mirror trajectory having a continuum of mirror positions, at each mirror position, the plane of the mirror approximately bisects at approximately 90° a plurality of imaginary lines between cells of the light emitter means and their corresponding focal points on an image plane, the mirror mechanism moves the mirror along the mirror trajectory and the light emission mechanism rotates the light emitter means synchronously with the movement of the mirror along the mirror trajectory so the image focuses at the plane of the image formation system when the image scans across the image formation system.

2. The system, as in claim 1 wherein:
   the mirror trajectory requires both translational and rotational motion of the mirror;
   the mirror mechanism translates and rotates the mirror; and
   the light emission mechanism rotates the light emitter means at twice the rotational rate of the mirror.

3. The system, as in claim 1 wherein the plane of the mirror approximately bisects at approximately 90° all imaginary lines between all the cells of the light emitter means and all their corresponding focal points on the image plane.

4. The system, as in claim 1 wherein the light emitter means further comprises three light emitters, each with a color filter.

5. A system for projecting an image, comprising
   a. a light emitter means, for producing bundles of light corresponding to portions of the image to be projected;
   b. an image formation system for focusing the bundles of light to form the image at a distant point;
   c. a mirror located to deflect the image to the plane of the image formation system;
   d. a mirror mechanism means, attached to the mirror, for translating and rotating the mirror;
   e. a light emission mechanism means, attached to the light emitter means, for rotating the light emitter means at twice the rotational rate of the mirror; and
   f. a mirror trajectory means for continually focusing the image on the plane of the image formation system, the mirror trajectory means has a continuum of positions, at each mirror position, the mirror approximately bisects at approximately 90° a plurality of imaginary lines between cells of the light emitter means and their corresponding focal points on the image plane, the mirror mechanism means translates and rotates the mirror along the mirror trajectory means and the light emission mechanism means rotates the light emitter means synchronously with the translation and rotation of the mirror along the mirror trajectory means.

6. The system, as in claim 5 wherein the mirror approximately bisects at approximately 90° all imaginary lines between all the cells of the light emitter means and all their corresponding focal points on the image plane.

7. The system, as in claim 5 wherein at each mirror position, a first distance between the plane of the mirror and any cell on the light emitter means equals a second distance between the corresponding focal point of that cell and the plane of the mirror.

8. A method for projecting an image, comprising the steps of:
   a. positioning a mirror and a light emitter means, for producing bundles of light corresponding to portions of the image to be projected, so the mirror deflects the image to the plane of an image formation system for focusing the bundles of light to form the image at a distant point;
   b. rotating and translating the mirror to scan the image across the image formation system;
   c. rotating the light emitter means at twice the rotational rate of the mirror; and
   d. focusing the image at the plane of the image formation system, during the rotating and translating step, by continually positioning the mirror to approximately bisect at approximately 90° a plurality of imaginary lines between the cells of the light emitter means and their corresponding focal points on the image plane.

9. The method, as in claim 8 wherein the step of focusing the image further comprises continually positioning the mirror to make a first distance between the plane of the mirror and any cell on the light emitter means equal to a second distance between the corresponding focal points of that cell and the plane of the mirror.

10. The method, as in claim 8 further comprising the step of:
    generating the image using three light emitters positioned side by side per each of the bundles, each of the light emitters with a color filter.

* * * * *